INVENTOR
DARYL R. BOOMER

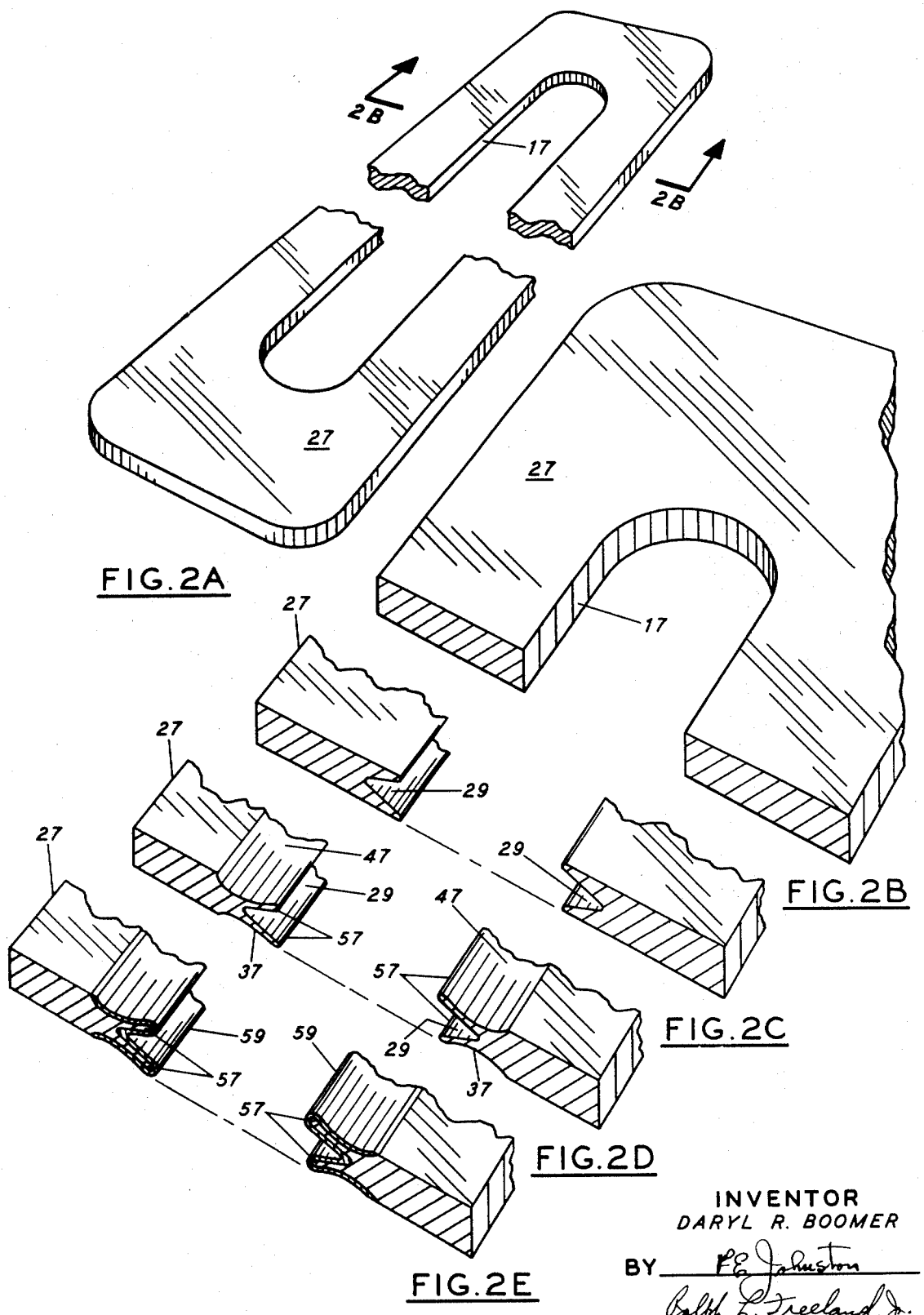

United States Patent Office 3,516,148
Patented June 23, 1970

3,516,148
METHOD OF FORMING A HIGH PRESSURE SEAL FOR NONCIRCULAR OPENINGS
Daryl R. Boomer, 18802 Haven Lane,
Yorba Linda, Calif. 92686
Filed Mar. 18, 1968, Ser. No. 713,848
Int. Cl. B23k 19/00
U.S. Cl. 29—527.4
2 Claims

ABSTRACT OF THE DISCLOSURE

A K-configuration self-energizing seal for noncircular openings is formed of flat stock. A groove is cut in the face around the opening and valleys are cut in the upper and lower surfaces of the stock to form the legs of the K. The legs are coated with soft material to assure sealing of the tips of the legs as pressure is applied in the groove.

---

The present invention relates to high pressure sealing of the noncircular openings. More particularly, it relates to a method of forming a self-energizing high-pressure gasket or for an opening such as an observation window over an elongated slot in a vessel to permit study of physical conditions or reactions of materials at a high pressure in the vessel.

It is a particular object of the invention to provide an effective self-energizing gasket to pressure seal noncircular openings in vessels operating over a range of 5,000 to 25,000 lbs./sq. inch at temperatures in the range of −40 to +1600° F. by forming the gasket of flat stock material generally shaped to cover the sealing surfaces around the noncircular opening.

Noncircular openings such as elongated slots, square windows or other irregularly shaped openings are often required in vessels operating at superatmospheric or vacuum pressures at both above and below ambient temperatures. Generally, self-energizing gaskets for sealing such noncircular openings have been formed by first forming the sealing surfaces in a circular form that is then deformed to the general shape of the noncircular opening. The difficulty of such an arrangement is that if the gasket can be deformed in this manner, it no longer has the dimensional stability it had in the circular form and the gasket is subject to twisting or other deformation either during assembly or under pressure. Such lack of dimensional stability of the finished noncircular gasket also makes the cost of machining the gasket to the final shape prohibitive because of the difficulty of holding the gasket while machining it.

In accordance with the present invention, I have found it possible to make a gasket that not only has sufficient dimensional stability to permit easy machining of noncircular configuration, but also provides the necessary stability to insure its proper installation and prevents twisting and other undesirable deformations when the pressure is applied. The gasket is formed from a sheet of flat stock, such as sheet steel, or other springy metal, in a configuration generally known as a K shape with the back of the K very wide with respect to its height. To accomplish this, the stock is formed as a gasket blank in the general configuration of the surfaces to be sealed, including the noncircular opening through the stock. The legs of the K are formed by cutting or otherwise forming a groove in the continuous face or edge of the gasket surrounding the noncircular opening, and the stock is reduced in thickness on both faces at a fixed distance from the noncircular opening toward the root of the groove to form the legs of the K.

In completing the gasket, the surfaces of the legs are desirably coated with a deformable material such as copper, gold, silver, Teflon, nickel, pure iron or the like, to form a yieldable seal when placed between the pressure vessel and its associated connection. This coating of the sealing surfaces slightly increases the thickness of the gasket at the sealing surfaces and provides a yieldable initial seal.

Further objects and advantages of the present invention will be apparent from the following detailed description and the accompanying drawings which form a part of this application.

In the drawings:

FIG. 2A is a perspective view of a gasket blank formed for sealing a noncircular opening.

FIG. 2B is a partial perspective view taken in the direction of arrows 2B—2B in FIG. 2A.

FIGS. 2C, 2D and 2E are views similar to FIG. 2B showing successive steps to form a self-energizing noncircular gasket according to the present invention.

Figure 1:
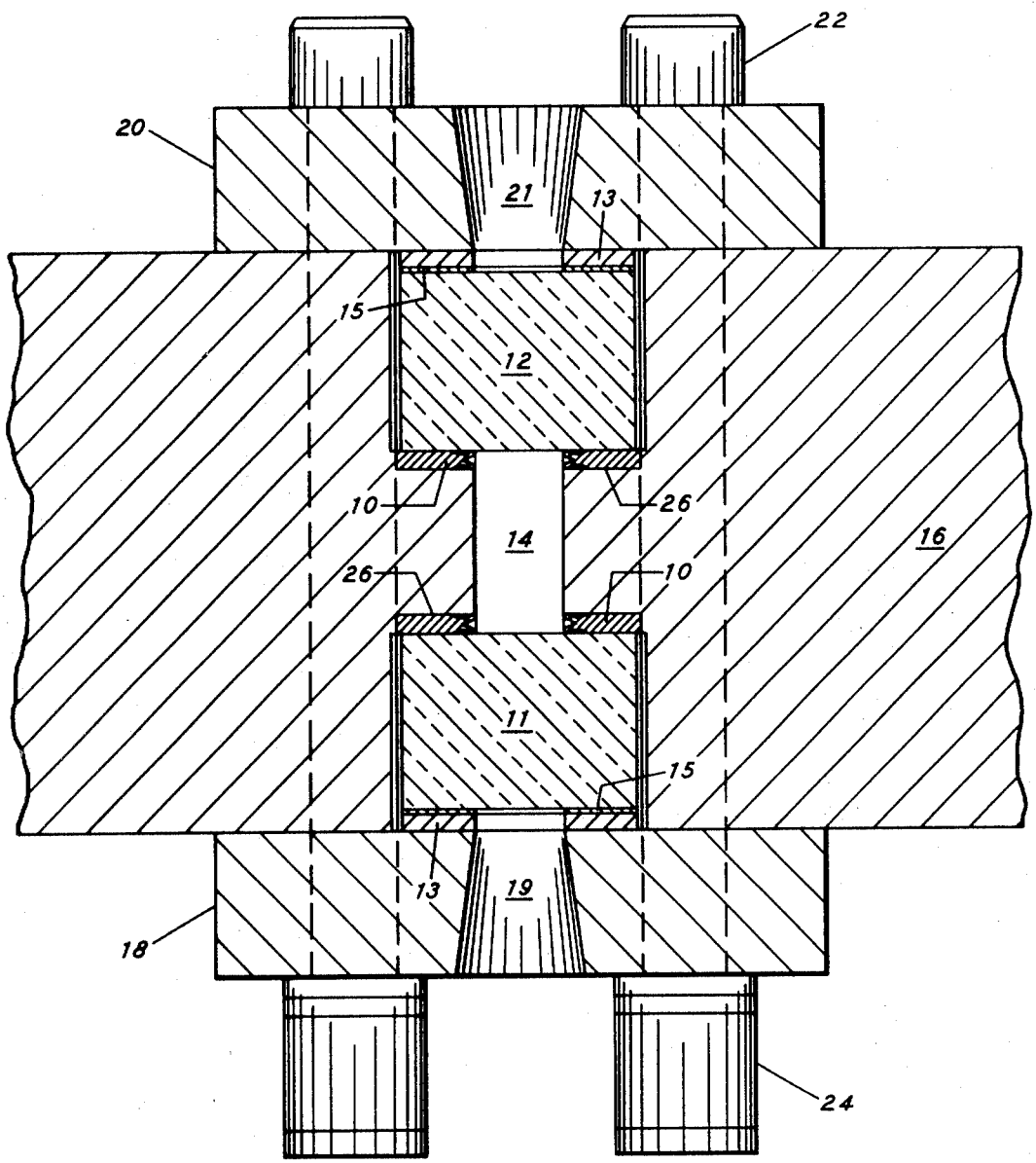
FIG. 1 illustrates application of a noncircular seal between a high pressure vessel and a pair of optical windows suitable for use in studies of phase changes in liquids under high pressure, high temperature (or both) conditions.

Referring now to FIG. 1, a pair of self-energizing gaskets 10, according to the present invention, are indicated as sealing elements for a pair of optical windows 11 and 12 on opposite sides of a high pressure cavity 14 within a pressure cell body 16. Windows 11 and 12 are mechanically held by cover plates 18 and 20 to body 16 through copper spacers 15, steel spacers 13, bolts 22 and nuts 24. The combined thickness of steel spacer 13, copper spacer 15, windows 11 and 12, and unplated portion of self-energizing gasket 10 is adjusted to be slightly less, say 0.002 inch less, than the cavity between the cover plates 18 or 20 and the mounting face of the cell body 26. As indicated, pressure cavity 14 is generally rectangular in form, as are windows 11 and 12 and openings 19 and 21 respectively in cover plates 18 and 20. For this reason, the pressure seal between windows 11 and 12 and cavity 14 is also desirably rectangular in form, so that optical or camera observation can be made through windows 11 and 12 of fluid conditions in cell 14. As noted, gasket 10 desirably is self-energizing; that is, the pressure within cavity 14 should help create the sealing force between body 14 and windows 11 or 12. It is also important that body portion 20 of gasket 10 be maintained as nearly flat as possible to conform to mounting face 26 of cell body 16 and its interfaces with windows 11 and 12 so that the entire assembly, including gasket 10, is dimensionally stable upon application of pressures in the range of 5,000 to 25,000 pounds per square inch over a temperature range of several hundred degrees Fahrenheit.

In construction of gaskets 10, I have found it possible to attain such dimensional stability even when formed about noncircular openings of the type illustrated in FIG. 1. To start, a gasket blank is formed of flat material, or stock, 27 such as sheet Inconel, steel, or the like as the base metal. As shown, in FIG. 2A, the outer periphery of the base stock then is cut, or formed, to the shape of the surfaces to be sealed. Then, as shown in FIGS. 2A and 2B, a noncircular opening 17 is cut or formed in base material 27. Next, a groove 29 is cut or milled completely around the internal edge surrounding the noncircular opening. This groove is indicated in FIG. 2C. To complete the legs of the K-shape, as indicated in FIG. 2D, material is removed, as by milling or grinding to form valleys in both the upper and lower faces 37 and 47, respectively, of stock 27. Sufficient material is removed by these valleys to make the legs, or walls, flexible while substantially the original thickness of the flat stock is maintained around the noncircular opening as well as the original thickness over the rest of faces 37 and 47 toward the outer periphery of blank 27. It will be noted that the root or bottom of groove 29 terminates in the region between the valleys, or relieved portions in faces 37 and 47.

The base metal of stock 27 is a springy material such as inconel, or stainless steel, or one that can be made into a springy material by heat treating either before or after machining. The outer ends and outer faces of the K-legs 57 should be coated with a soft material 59 such as copper, gold, silver, Teflon, nickel and the like. In the particular arrangement shown in FIGS. 1 and 2E, it has been found advantageous to plate the legs 57 with a coating 59 of pure iron at least 0.001 inch thick. Such plating increases slightly the gasket thickness across the legs so that it is slightly greater than that of base 27. Because of this, when the seal is installed, coating 59 on the outer sides of legs 57 first contacts cell body 16 and windows 11 and 12 tending to make a seal even before pressure is applied. Then after the application of pressure the material further deforms to conform to irregularities of the opposing faces to complete the seal.

It will be apparent rfom the foregoing that in accordance with the method of the present invention, K-legs 57 can be formed in flat stock 27 by routing, milling, grinding, or the like. Similarly, the relieved portions on the face of the stock around the root of the central groove may be formed by any suitable machining process. Such processing will of course largely depend upon the material of stock 27. It will also be apparent that groove 29 can be formed after the valleys in faces 37 and 47 are formed.

A particular advantage of the arrangement of the present invention is that such self-energizing gaskets are formed of flat material that is readily cut into any suitable regular or irregular configuration about a noncircular opening and such opening can be sealed without necessity of deforming or otherwise modifying the shape of the gasket, as initially formed, to conform to such a noncircular opening. Accordingly, higher pressures and temperatures may be sealed against than has been found practical heretofore.

All modifications and changes coming within the scope of the appended claims are intended to be included.

I claim:

1. A method of forming a high-pressure self-energizing seal about a noncircular opening which comprises forming a sheet of flat stock into a gasket blank having the general configuration of the surfaces to be sealed including said noncircular opening, reducing the thickness on both sides of said stock at a fixed distance toward the outer periphery of said gasket blank from said noncircular opening, cutting from the continuous face surrounding said noncircular opening a groove to form upper and lower K-legs surrounding said noncircular opening, the bottom of said groove terminating at a depth in said stock within the reduced thickness portion of said blank and coating the legs surrounding said noncircular opening with a malleable material on at least the upper and lower faces of said K-legs at the points of contact with the surfaces to be sealed thereby.

2. The method of forming a high pressure seal surrounding a noncircular opening in a pressure vessel which comprises forming a pressure gasket of flat sheet of springy material having a noncircular opening corresponding to the shape of said opening in the pressure vessel, forming in the edge face around said noncircular opening a groove extending from said edge face toward the outer periphery of said gasket, removing substantially equal amounts of material from opposite faces of said gasket over an area extending from said noncircular opening toward the outer edge of the gasket including an area extending over the root of said groove, in said removal of material shaping the metal from the point of termination of the full thickness of said sheet to the edges of said noncircular opening to form a smooth transition from said full thickness of the original stock to the initial contact area peripheral to said noncircular opening and coating said shaped surfaces with a deformable metal to assure sealing of said shaped portions against sealing faces of the vessel about said noncircular opening.

References Cited

UNITED STATES PATENTS

| | | | |
|---|---|---|---|
| 2,330,425 | 9/1943 | Hilton. | |
| 3,192,690 | 7/1965 | Taylor | 220—46 |
| 3,294,409 | 12/1966 | Burtis | 220—46 X |
| 3,325,892 | 6/1967 | Delgodo | 29—527.2 X |

JOHN F. CAMPBELL, Primary Examiner

D. C. REILEY, Assistant Examiner

U.S. Cl. X.R.

220—46